(12) United States Patent
Laitinen et al.

(10) Patent No.: US 7,877,787 B2
(45) Date of Patent: Jan. 25, 2011

(54) METHOD AND APPARATUS FOR OPTIMAL TRANSFER OF DATA IN A WIRELESS COMMUNICATIONS SYSTEM

(75) Inventors: Pekka Laitinen, Helsinki (FI); Philip Ginzboorg, Espoo (FI)

(73) Assignee: Nokia Corporation, Espoo (FI)

( * ) Notice: Subject to any disclaimer, the term of this patent is extended or adjusted under 35 U.S.C. 154(b) by 987 days.

(21) Appl. No.: 11/304,684

(22) Filed: Dec. 16, 2005

(65) Prior Publication Data

US 2006/0185003 A1 Aug. 17, 2006

Related U.S. Application Data

(60) Provisional application No. 60/652,633, filed on Feb. 14, 2005.

(51) Int. Cl.
*G06F 21/00* (2006.01)
(52) U.S. Cl. .......................................... 726/4; 713/178
(58) Field of Classification Search ................. 713/178; 726/4
See application file for complete search history.

(56) References Cited

U.S. PATENT DOCUMENTS

| 2002/0037160 A1* | 3/2002 | Locket et al. ............... 386/111 |
| 2004/0230862 A1 | 11/2004 | Merchant et al. |
| 2008/0046779 A1* | 2/2008 | Merchant et al. ............... 714/6 |

FOREIGN PATENT DOCUMENTS

| CA | 2495343 A1 | 2/2004 |
| EP | 1168870 A1 | 1/2002 |
| EP | 1646177 A1 | 4/2006 |
| JP | 2001101321 A | 4/2001 |
| JP | 2002-084276 A | 3/2002 |
| JP | 2002-297932 A | 10/2002 |
| JP | 2004181140 A | 7/2004 |
| WO | WO03041442 A1 | 5/2003 |
| WO | WO03107584 A1 | 12/2003 |
| WO | WO2005011192 A1 | 2/2005 |
| WO | 2006/085170 | 8/2006 |

OTHER PUBLICATIONS

3GPP TSG SA WG3 Security-SA3 #36 S3-040933, "Update of GUSS in BSF", Nov. 23-26, 2004, pp. 1 -2.
3GPP TSG SA WG3 Security-S3#36 S3-040986, "Fetching of one A V only on each Ah run between BSF and HSS", Nov. 23-26 2004, pp. 1-8.

(Continued)

*Primary Examiner*—Nasser Moazzami
*Assistant Examiner*—Lisa Lewis
(74) *Attorney, Agent, or Firm*—Mintz, Levin, Cohn, Ferris, Glovsky and Popeo, P.C.

(57) ABSTRACT

An apparatus and method for sharing data in a communications system include a bootstrapping server function (BSF) configured to transmit a first message. The first message includes a timestamp parameter corresponding to a generic bootstrapping architecture user security settings (GUSS) stored in the BSF. A home subscriber server (HSS) is configured to receive the first message, to compare the timestamp parameter corresponding to the GUSS stored in the BSF with a timestamp parameter corresponding to a GUSS stored in the HSS, and to transmit a second message back to the BSF excluding the GUSS when the timestamp parameters of the GUSS of the BSF and the HSS are equal.

35 Claims, 4 Drawing Sheets

OTHER PUBLICATIONS

3GPP TSG SA WG3 Security-SA3#37 S3-050056, "GBA User Security Settings (GUSS) transfer optimization", Feb. 21-25, 2005, pp. 1-7.

English Translation of Non-Final Rejection dated Mar. 30, 2009, issued by the Korean Intellectual Property Office (KIPO), in connection with counterpart application 10-2007-7021233.

Examination Report issued by the Intellectual Property Corporation of Malaysia, dated Aug. 21, 2009, issued in connection with corresponding Malaysian Patent Application No. PI 20060371.

Kitaguchi et al., "Designing a high precise NTP server for applications using time information", Research Report of Information Processing Society, Jul. 17, 2001, vol. 2001, No. 70, pp. 47-53.

* cited by examiner

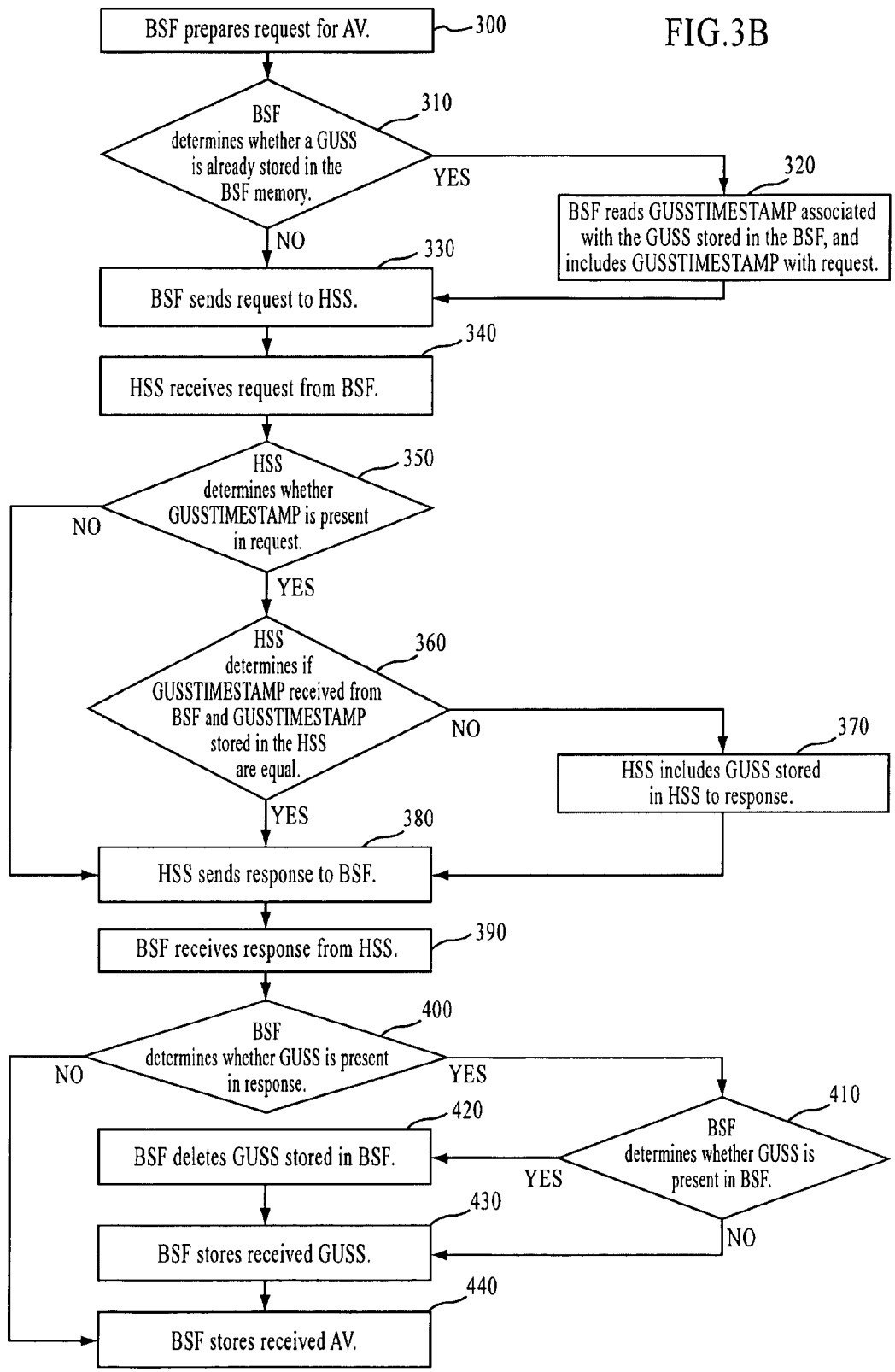

METHOD AND APPARATUS FOR OPTIMAL TRANSFER OF DATA IN A WIRELESS COMMUNICATIONS SYSTEM

REFERENCE TO RELATED APPLICATIONS

This application claims priority of U.S. Provisional Patent Application Ser. No. 60/652,633, filed Feb. 14, 2005. The subject matter of this earlier filed application is hereby incorporated by reference.

BACKGROUND OF THE INVENTION

1. Field of the Invention

The present invention relates to an apparatus and method for sharing secured data between functions and elements in a communications system, and in particular, to an apparatus and method for determining a validity of secure data and subsequent sharing of the data based on the result of the determination.

2. Description of the Related Art

Communications, and more particularly, wireless communications systems have become increasingly available and affordable to vast sections of the world's population. The success of such wireless communications systems has in turn resulted in a need to accommodate the tremendous growth in the number of subscribers. One method of addressing the need to accommodate the tremendous growth has been to make the wireless communications system scalable. Another method has been to optimize the elements, and functions that make the wireless communications systems. As a result, the architectural framework of communications systems has been constantly evolving.

One such area that has been evolving is an authentication architecture in the wireless communication systems. In the wireless communications systems, a number of applications share a need for mutual authentication between a client/User Equipment (UE) and an application/application server before further communication can take place. Examples include, but are not limited to, a communication between a client and a presence server or a communication with a content server. Because many applications share this common need for a peer authentication mechanism, a Generic Authentication Architecture (GAA) has been developed.

Initial authentication (i.e., bootstrapping) of Third Generation Project Partnership (3GPP) Generic Authentication Architecture (GAA) is based on AKA (Authentication and Key Agreement Protocol). The GAA architecture is described in a document produced by the 3rd Generation Partnership Project (3GPP). The document reference is, 3GPP TS 33.919: "3rd Generation Partnership Project; Technical Specification Group Services and System Aspects; 3G security; Generic Authentication Architecture (GAA); System description," attached hereto as Appendix A, the contents of which are hereby incorporated by reference.

One of the salient aspects of the GAA, is that includes an application independent mechanism that provides a client/UE and an application/application server with a common shared secret. This shared secret can subsequently be used to authenticate the wireless communication between the client/UE and the application/application server. This aspect is described in a document produced by the 3rd Generation Partnership Project (3GPP) and the document reference is, "3GPP TS 33.220: 3rd Generation Partnership Project; Technical Specification Group Services and System Aspects; 3G security; Generic Authentication Architecture (GAA); Generic bootstrapping architecture (Release 7)," attached hereto as Appendix B, and "3GPP TS 29.109: 3rd Generation Partnership Project; Technical Specification Group Core Networks and Terminals; Generic Authentication Architecture (GAA); Zh and Zn Interfaces based on the Diameter protocol; Stage 3 (Release 7)," attached hereto as Appendix C, the contents of which are hereby incorporated by reference.

SUMMARY OF THE INVENTION

According to an embodiment of the present invention, there is provided an apparatus for sharing data in a communications system, including a bootstrapping server function (BSF) configured to transmit a first message, wherein the first message includes a timestamp parameter corresponding to a generic bootstrapping architecture user security settings (GUSS) stored in the BSF. A home subscriber server (HSS) configured to receive the first message, to compare the timestamp parameter corresponding to the GUSS stored in the BSF with a timestamp parameter corresponding to a GUSS stored in the HSS, and to transmit a second message back to the BSF excluding the GUSS when the timestamp parameters of the GUSS of the BSF and the HSS are equal.

According to an embodiment of the present invention, there is provided a method for sharing data in a communications system including transmitting a first message from a bootstrapping server function (BSF) to a home subscriber server (HSS), wherein the first message includes a timestamp parameter corresponding to a generic bootstrapping architecture user security settings (GUSS) stored in the BSF; comparing the timestamp parameter corresponding to the GUSS stored in the BSF with a timestamp parameter corresponding to a GUSS stored in the HSS; and transmitting a second message back to the BSF excluding the GUSS when the timestamp parameters of the GUSS of the BSF and the HSS are equal.

According to an embodiment of the present invention, there is provided a computer program embodied within a computer readable medium to provide sharing of data in a communications system including transmitting a first message from a bootstrapping server function (BSF) to a home subscriber server (HSS), wherein the message includes a timestamp parameter corresponding to a generic bootstrapping architecture user security settings (GUSS) stored in the BSF; comparing the timestamp parameter corresponding to the GUSS stored in the BSF with a timestamp parameter corresponding to a GUSS stored in the HSS; and transmitting the second message back to the BSF excluding the GUSS when the timestamp parameters of the GUSS of the BSF and the HSS are equal.

According to an embodiment of the present invention, there is provided an apparatus a communications system, comprising: a network application function (NAF); a user equipment configured to communicate with the NAF and to transmit a request for authentication information; and a bootstrapping server function (BSF) configured to receive the request and to transmit a first message. The first message includes a timestamp parameter corresponding to a generic bootstrapping architecture user security settings (GUSS) stored in the BSF. A home subscriber server (HSS) is configured to receive the first message, to compare the timestamp parameter corresponding to the GUSS stored in the BSF with a timestamp parameter corresponding to a GUSS stored in the HSS, and to transmit a second message back to the BSF excluding the GUSS when the timestamp parameters of the GUSS of the BSF and the HSS are equal.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIGS. 3A and 3B illustrate a method providing a generic bootstrapping architecture user security setting timestamp to minimize traffic load, in accordance with an embodiment of the present invention.

DETAILED DESCRIPTION OF THE PREFERRED EMBODIMENTS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

3GPP GBA is a proposed (3GPP TS 33.220, attached hereto as Appendix B, and 3GPP TS 29.209, attached hereto as Appendix C, the contents of which are hereby incorporated by reference) authentication infrastructure. This infrastructure may be utilized to enable application functions in a network side and on a user side to communicate in situations where the network side and the user side would not otherwise be able to communicate. This functionality is referred to as "bootstrapping of application security," or more generally simply as "bootstrapping."

The general principles of bootstrapping are that a generic bootstrapping server function (BSF) allows user equipment (UE) to authenticate therewith, and agree on session keys. Such authentication may be based on authentication and key agreement (AKA). By running AKA, the mobile terminal and the network mutually authenticate each other and agree on keys, specifically a confidentiality key (CK) and an integrity key (IK). After this authentication, the UE and a network application function (NAF), which may also be referred to as a service provider, may run some application specific protocol where the authentication of messages is based on the session keys agreed between the UE and the BSF.

The bootstrapping function is not intended to be dependent upon any particular network application function. The server implementing the bootstrapping function must be trusted by a home operator to handle authentication vectors. Network application functions may be supported in the operator's home network, a visited network, or in a third network.

Figure 1:
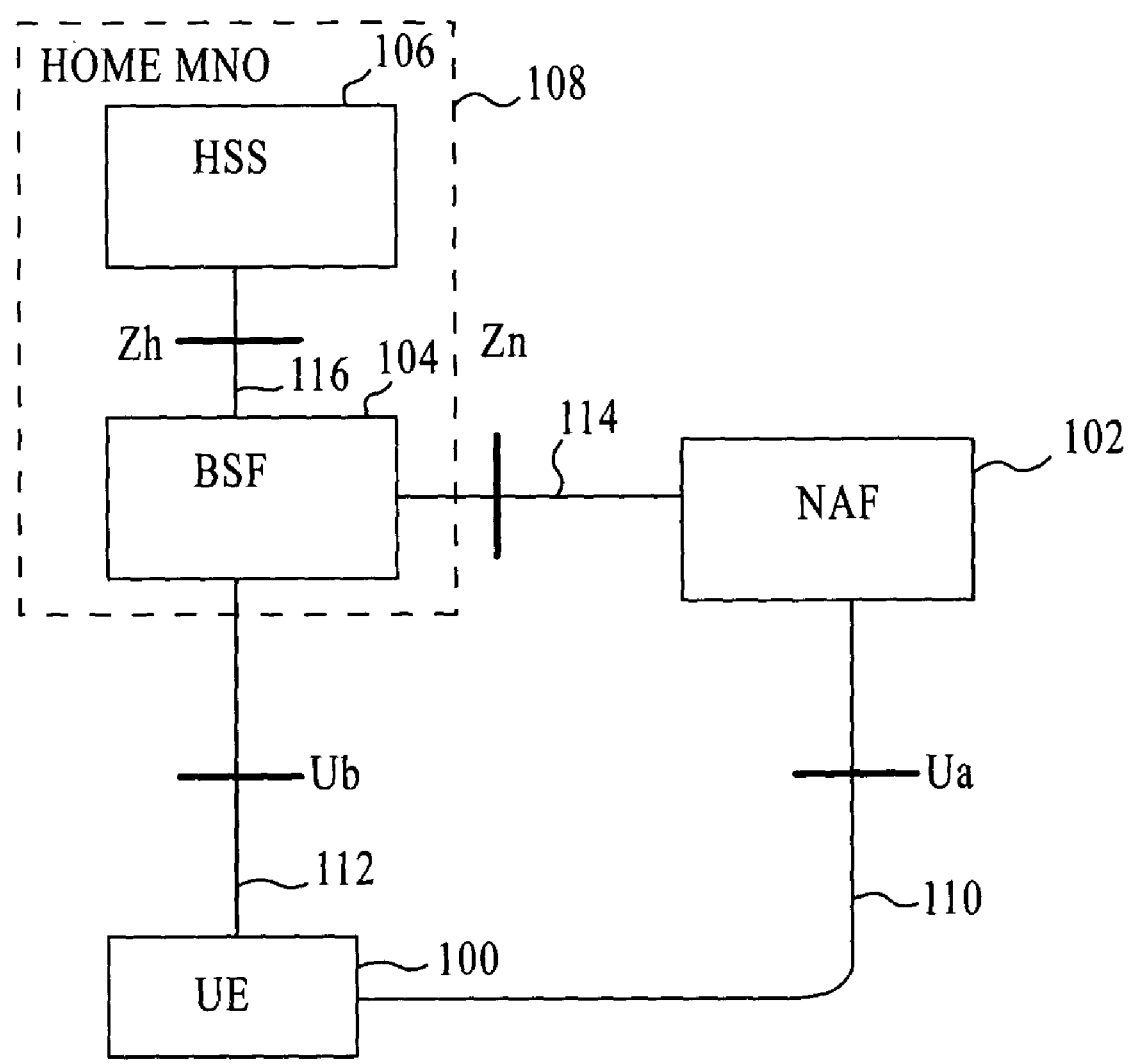
FIG. 1 illustrates an apparatus to provide generic mechanism for a network application server, in accordance with an embodiment of the present invention.

FIG. 1 illustrates an exemplary network architecture, in accordance with an embodiment of the present invention. The network architecture includes a user equipment (UE) 100, at least one network application function (NAF) 102, a bootstrapping server function (BSF) 104, and a home subscriber system (HSS) 106. The BSF 104 and HSS 106 form part of a home mobile network operator (MNO) 108. The UE 100 connects into the MNO 108 in accordance with well-known mobile communication techniques.

The NAF 102 is hosted in a network element, under the control of the MNO 108, for instance, and the BSF 104 may be also hosted in a network element under the control of the MNO 108. Thus, for practical purposes, each of the NAF 102 and the BSF 104 may be considered to be a network element. In addition, the MNO 108 may include a controller (not shown) to execute operations to be described in FIGS. 3A and 3B. The controller may include permanent or removable storage, such as magnetic and optical discs, RAM, ROM, etc., on which the process and data structures of the present invention may be stored and distributed.

As illustrated in FIG. 1, the UE 100 communicates with the NAF 102 through a Ua interface 110. The UE 100 communicates with the BSF 104 through an Ub interface 112. The NAF 102 communicates with the BSF 104 through a Zn interface 114. The BSF 104 communicates with the HSS 106 through a Zh interface 116.

The NAF 102 may be provided in a further separate network. For instance, as illustrated in FIG. 1, an exemplary network architecture is provided in which NAF 102 is in the visited network. In the case where UE 100 has contacted a NAF 102 that is operated in another network than the home network, this visited NAF 102 may use a diameter proxy (D-Proxy) of the NAFs network to communicate with subscriber's BSF (i.e. home BSF) 104. The NAF 102 would then communicate with the BSF 104 through the Zn interface 114 to the D-Proxy and through a Zn' interface 120 to the BSF 104.

For FIG. 1, the principle of bootstrapping is that the UE 100 and the bootstrapping server function mutually authenticate each other, for instance, using the AKA protocol, and agree on a master shared secret. Afterwards the master shared secret is used to derive one or more network application function specific shared secrets that are applied between the UE 100 and the particular NAF in question. A NAF specific shared secret key material is generated specifically for each network application function independently. After the bootstrapping operation has been completed, the UE 100 and the network application function may run some specific protocols where the securing of messages will be based on those keys generated during the mutual authentication between the UE 100 and the bootstrapping server function. Thus, the keys may be used for authentication and integrity protection, and for confidentiality. The network application function is then able to acquire the NAF specific shared secret derived from the master shared secret established between the user equipment and the bootstrapping server function.

Furthermore, the communication Ub interface 112 supports the bootstrapping authentication and key agreement protocol, to provide the mutual authentication and key agreement between the UE 100 and the BSF 104. The Zh interface 116 allows the BSF 104 to fetch any required authentication information and subscriber profile information (e.g., an authentication vector, AV) from the HSS 106. The set of subscriber's user security settings (USS) are part of subscriber's GUSS, which may be stored in the HSS. In a case where a person has multiple subscriptions, i.e., multiple IP Multimedia Subsystem Subscriber Identity Module cards (ISIMs) or Universal Subscriber Identity Module cards (USIMs) applications on an Universal Mobile Telecommunications System Integrated Circuit Card (UICCs), the HSS 106 shall contain one or more GUSSs that can be mapped to any one or more identities, e.g., IP Multimedia Private Identity (IMPIs) and International Mobile Subscriber Identity—IMSIs. The Ua interface 110 supports any application specific protocol, which is secured using the NAF specific shared secret derived from the master shared secret agreed between the UE 100 and the BSF 104, based on the protocol supported by the Ub interface 112. The Zn interface 114 is used by the NAF 102 to fetch the NAF specific shared secret that has derived from the master shared secret agreed in the protocol supported on the Ub interface 112 from the BSF 104. The Zn interface 114 may also be used to fetch subscriber profile information from the BSF 104.

A message transmitted from BSF 104 to the NAF 102 includes bootstrapping information. The bootstrapping information may include a transaction identifier, the NAF specific shared secret, and subscriber profile information ("prof_naf" or "any NAF specific USSs").

Furthermore, a set of Generic Bootstrapping Architecture User Security Settings (GUSS) may be also included in the bootstrapping information and a set of all application-specific USSs. Typically, BSF requests an AV for a particular subscriber and then in receives also the GUSS of that subscriber together with the requested AV. During operation, the BSF 104 may be able to retrieve a single authentication vector (AV) at a time from the HSS 106 over Zh, an HSS interface from BSF 104, thereby forcing the BSF 104 to update the GUSS stored therein with the new copy of the GUSS from the HSS 106 when the UE 100 bootstraps with the BSF 104. So, if the NAF 102 needs to obtain an updated USS, or multiple USSs, from the BSF 104, the NAF 102 needs to request the UE 100 to bootstrap with the BSF 104, that is, renegotiate, and a next time the NAF 102 requests a particular USS from the BSF 104, the NAF 102 knows that the GUSS is up-to-date.

However, this update procedure forces the HSS 106 to send the GUSS every time a new AV is requested, regardless of whether the GUSS has been updated in the HSS 106 since the last time the BSF 104 received the GUSS. During the update procedure, the traffic load is large between the BSF 104 and the HSS 106 by sending the AV with the GUSS, as the GUSS may be quite large in size. The sending of GUSS to the BSF 104 even in cases where the BSF 104 has already a copy of same GUSS is unnecessary, and causes waste of bandwidth and computer resources. Accordingly, the number of times the GUSS is transferred from the HSS 106 to the BSF 104 needs to be minimized.

To do so, the apparatus and method of the present invention configure and transmit the GUSS to include a timestamp from the HSS 106 to the BSF 104 to minimize the traffic load related to the GUSS transfer procedure between the BSF 104 and the HSS 106. The apparatus and method of the present invention, therefore, allow sharing of secured data between functions and elements in a communications system by determining a validity of secure data and subsequent sharing of the data based on the result of the determination.

In accordance with embodiments of the present invention, data in the transmitting or source network element, for instance the HSS 106 in the GBA, is transferred to or shared with a requesting or a receiving network element, for instance, the BSF 104 in the GBA, only when the requesting or receiving network element does not have a copy of or access to the very same data that exists on the transmitting or source network element.

Accordingly, a GUSS timestamp is added to each GUSS indicating when the GUSS was last changed by the HSS 106. This timestamp is used to optimize the GUSS transfer policy between the HSS 106 and the BSF 104. If the BSF 104 has subscriber's GUSS in memory when it needs to retrieve a new authentication vector (AV) for the subscriber, it will also include the GUSS timestamp to the request. Upon receiving the GUSS timestamp, the HSS 106 will compare it to the timestamp of the GUSS stored in its databases. If the timestamps are equal, the HSS 106 does not send the GUSS to the BSF 104 as the BSF 104 already has a copy of the GUSS. If the timestamps are not equal, the HSS 106 sends the GUSS as the BSF 104 has an invalid GUSS, which needs to be updated. If the HSS 106 has no GUSS, for instance, because the GUSS has been deleted using a management interface of the HSS, then the HSS 106 will send a no GUSS message to the BSF 104 and the BSF 104 will delete the old GUSS.

Figure 2:
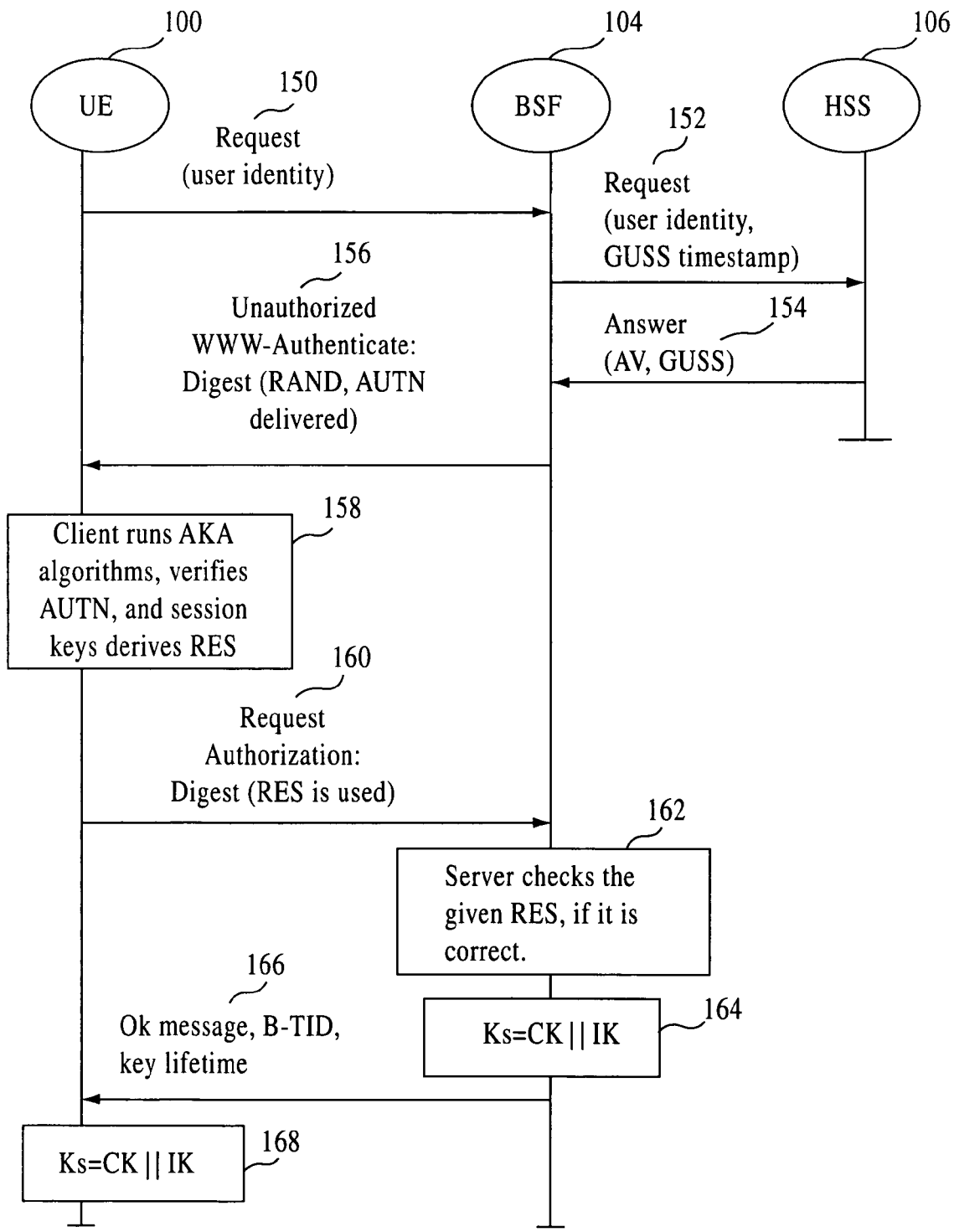
FIG. 2 is one embodiment of an example of information transferred between a bootstrapping server function and a home subscriber server.

FIG. 2 illustrates a communication between the BSF 104 and the HSS 106 including the GUSS timestamp, in accordance with an embodiment of the present invention. At operation 150, the UE 100 issues a request for a new bootstrapping including user identity information pertaining to the UE 100. When the BSF 104 is retrieving or requesting the new AV from the HSS 106, at operation 152, the request for a new AV would also include a GUSS timestamp if the GUSS already exists or is stored in a memory of the BSF 104 (i.e., a BSF memory). Upon receiving the GUSS timestamp, the HSS 106 checks and compares the GUSS timestamp with the GUSS timestamp stored in a memory provided therein (i.e., an HSS memory). At operation 154, if the GUSS timestamp received from the BSF 104 and the GUSS timestamp stored in the HSS 106 are different, the HSS 106 includes the updated GUSS, the GUSS timestamp for the updated GUSS, and the new AV requested. If the GUSS timestamps are the same, that is, the GUSS in the BSF 104 memory and the GUSS in the HSS 106 memory are the same, the GUSS is not sent to the BSF 104 with the new AV requested.

Naturally, the GUSS timestamp may be sent from the BSF 104 to the HSS 106 only if the BSF 104 has a GUSS for a particular subscriber in the BSF memory. In this instance, the GUSS timestamp is not sent to the HSS 106 and the HSS 106 returns the subscriber specific GUSS from databases therein back to the BSF 104.

At operation 156, the BSF 104 forwards a Random Challenge Data (RAND) and an Authentication Token (AUTN) to the UE 100 in a message to demand the UE 100 to authenticate itself. At operation 158, a client associated with the UE 100 runs Authentication and Key Agreement (AKA) algorithms, verifies the AUTN, and derives an Authentication Result (RES). The UE 100 also calculates a Confidentiality Key (CK), an Integrity Key (IK), and RES, which will result in to same session keys IK and CK in both BSF 104 and UE 100. At operation 160, the UE 100 sends a Hypertext Transport Protocol (HTTP) request containing an AKA response, calculated using RES, to the BSF 104. At operation 162, the BSF 104 authenticates the UE 100 by verifying the AKA response. At operation 164, the BSF 104 generates a key material (Ks) by concatenating the CK and IK. At operation 166, the BSF 104 sends an OK message and the bootstrapping transaction identifier (B-TID) and lifetime of the key Ks to the UE 100 to indicate the success of the authentication. In addition, at operation 168, the UE 100 generates the key material (Ks) the same way the BSF 104 generated in operation 164 and stores the Ks. B-TID, and the lifetime of Ks.

Accordingly, each of the GUSS in the HSS 106 includes a new timestamp parameter, e.g., labeled GUSSTIMESTAMP. The GUSSTIMESTAMP of the GUSS is set by the HSS 106, and it is a numeric or alphanumeric parameter indicative of the last time when the HSS 106 modified the GUSS. The parameter, GUSSTIMESTAMP, may also be indicative of a version of the GUSS data. The GUSSTIMESTAMP changes when a content of the GUSS changes. That is, if the GUSS in the HSS 106 is modified or updated, the HSS 106 assigns a new GUSSTIMESTAMP to the updated GUSS.

The GUSSTIMESTAMP may also be stored or communicated in an equivalent form or different form (i.e., numeric or alphanumeric) from the way the GUSSTIMESTAMP is stored or saved with the GUSS in the HSS 106. However, if stored or communicated in different form, this altered form of the GUSSTIMESTAMP may be transformed back to the original representation of the GUSSTIMESTAMP in the HSS 106. This transformation is done, for instance, when there is a need to compare multiple GUSSTIMESTAMPs.

In accordance with one aspect of the present invention, the BSF 104 receives the GUSS or its equivalent, from the HSS 106, and stores the GUSS in the BSF memory. When the BSF 104 requests the AV from the HSS 106, and it had previously received the corresponding GUSS, the request may include the GUSSTIMESTAMP. The HSS 106 compares the received GUSSTIMESTAMP, with the GUSSTIMESTAMP already stored in the HSS 106, and includes the GUSS in the reply only if both GUSSTIMESTAMPs are different. Both GUSSTIMESTAMPs may be different, for example, when the BSF 104 has an invalid or an outdated GUSS. If the GUSSTIMESTAMPs are equal, then the HSS 106 will not send the GUSS to the BSF 104 with the AV.

Figure 3A:
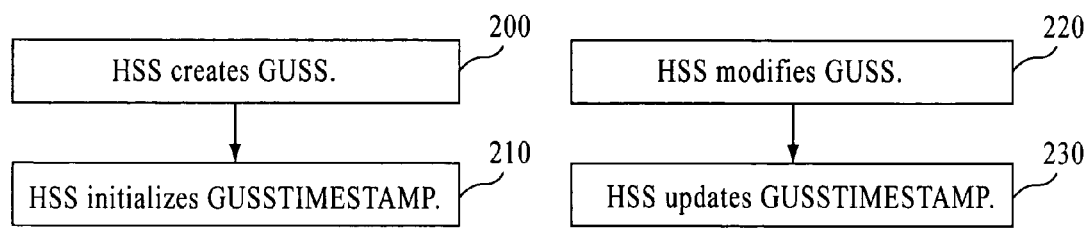

FIG. 3A illustrates a method to create and modify a GUSSTIMESTAMP, in accordance with an embodiment of the present invention. The initialization of GUSSTIMESTAMP happens when the particular GUSS is created. At operation 200, the HSS 106 creates the GUSS. At operation 210, the HSS 106 initializes the GUSSTIMESTAMP. The update operation of the GUSSTIMESTAMP is done whenever the particular GUSS is modified. At operation 220, the HSS 106 modifies the GUSS. At operation 230, the HSS 106 updates the GUSSTIMESTAMP.

There could be several methods used to assign the value of the GUSSTIMESTAMP parameter for a particular GUSS in HSS. In one embodiment of the present invention, GUSSTIMESTAMP may be assigned in a monotonically increasing sequence or a monotonically decreasing sequence. For instance, when a GUSS is first created, GUSSTIMESTAMP could be assigned or initialized to some numeric value or to the time and/or date indicated by a clock in the HSS 106. Each time the GUSS is modified and therefore becomes a new version, GUSSTIMESTAMP can, for example, be incremented or decremented by 1 or be changed to the current time and/or date indicated by the clock in the HSS 106. In another embodiment, the GUSS may be assigned a GUSSTIMESTAMP value that is a hash or part of that hash, such as SHA-1 or MD5, of the particular instance of the GUSS.

FIG. 3B illustrates a method providing a generic bootstrapping architecture user security setting timestamp to minimize traffic load, in accordance with an embodiment of the present invention. At operation 300, the method at the BSF 104 prepares a request for an authentication vector, AV. At operation 310, a determination is made at the BSF 104 as to whether the GUSS is already stored in the BSF memory. If the method determines that the GUSS is already stored, at operation 320, the method reads at the BSF 104 the GUSSTIMESTAMP associated with the GUSS stored in the BSF 104 and includes the GUSSTIMESTAMP with the request. However, if the method determines that the GUSS is not stored in the BSF 104, at operation 330, the method at the BSF 104 sends the request to the HSS 106.

At operation 340, the method receives the request from the BSF 104 at the HSS 106. At operation 350, a determination is made by the HSS 106 as to whether the GUSSTIMESTAMP is present in the request. If the method determines that the GUSSTIMESTAMP is present in the request, at operation 360, the method performs another determination at the HSS 106 as to whether the GUSSTIMESTAMP received from the BSF 104 and the GUSSTIMESTAMP stored in the HSS 106 are equal. Otherwise, if the method determines that the GUSSTIMESTAMP is not present in the request, after operation 350, the method proceeds to operation 380, to be later described.

If, at operation 360, the method determines that the GUSSTIMESTAMP received from the BSF 104 and the GUSSTIMESTAMP stored in the HSS 106 are equal, the method proceeds to operation 380, otherwise the method proceeds to operation 370. At operation 370, the method includes the GUSS stored in the HSS 106 in the response and proceeds to operation 380.

At operation 380, the method configures the HSS 106 to send a response to the BSF 104. At operation 390, the BSF 104 receives the response from the HSS 106. At operation 400, the method determines at the BSF 104 whether the GUSS is present in the response. If the GUSS is present in the response, at operation 410, the method determines at the BSF 104 whether the GUSS is already present in the BSF 104. Otherwise, the method proceeds to operation 440, to be later described. If the method determines that the GUSS is present in the BSF 104, the method proceeds to operation 420. Otherwise, the method proceeds to operation 430, to be later described.

At operation 420, the method at the BSF 104 deletes the GUSS stored in the BSF 104 and proceeds to operation 430. At operation 430, the method at the BSF 104 stores the received GUSS and, at operation 440, the BSF 104 stores the received AV.

It is to be understood that in the embodiment of the present invention, the operations are performed in the sequence and manner as shown although the order of some operations and the like may be changed without departing from the spirit and scope of the present invention.

Accordingly, the present invention provides adding a GUSS timestamp to each GUSS exchanged between a BSF and an HSS indicating when the GUSS was last changed by the HSS. The GUSS timestamp optimizes a data transfer policy between the BSF and the HSS. Specifically, if the BSF has data associated with a subscriber stored in a memory when a request to retrieve a new authentication vector is requested from the subscriber through a user equipment, the new AV request also includes the GUSS timestamp associated with the GUSS stored in the memory of the BSF. Upon receiving the GUSS timestamp, the HSS compares the GUSS timestamp received with a GUSS timestamp stored in a memory of the HSS. If the GUSS timestamps are the same or equal, the HSS does not send the GUSS to the BSF as the BSF already has a copy of the GUSS. If the GUSS timestamps are not equal, the HSS sends the GUSS as the BSF has an invalid GUSS, which needs to be updated.

In addition, while the terms packet and datagram have been used in the description of the present invention, the invention has import to many types of network data. For purposes of this invention, the term packet includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. An apparatus, comprising:
a bootstrapping server function configured to transmit a first message to a home subscriber server, wherein the first message includes a timestamp parameter corresponding to a generic bootstrapping architecture user security settings stored in the bootstrapping server function and wherein the timestamp parameter corresponding to the generic bootstrapping architecture user security settings stored in the bootstrapping server function is compared with a timestamp parameter corresponding to a generic bootstrapping architecture user security settings stored in the home subscriber server wherein the bootstrapping server function is further configured to: receive from a home subscriber server, a second message excluding the generic bootstrapping architecture user security settings when the timestamp parameters of the generic bootstrapping architecture user security settings of the bootstrapping server function and the home subscriber server are equal, and receive, from the home subscriber server, the second message including the generic bootstrapping architecture user security settings and the corresponding timestamp parameter, and update the bootstrapping server function using the generic bootstrapping architecture user security settings and the timestamp, when the timestamp parameters of the generic bootstrapping architecture user security settings of the bootstrapping sever function and the home subscriber server are not equal, wherein the bootstrapping server function and the home subscriber server provide authentication for a wireless mobile network.

2. The apparatus is recited in claim 1, where the timestamp parameter that corresponds to a particular generic bootstrapping architecture user security settings is part of the same generic bootstrapping architecture user security settings.

3. The apparatus as recited in claim 1, wherein the first message comprises a request for an authentication vector.

4. The apparatus as recited in claim 1, wherein the home subscriber server is configured to assign the timestamp parameters to the generic bootstrapping architecture user security settings.

5. The apparatus as recited in claim 1, wherein the home subscriber server is configured to change the timestamp parameter for the generic bootstrapping architecture user security settings when data of that generic bootstrapping architecture user security settings has been modified.

6. The apparatus as recited in claim 4, wherein the home subscriber server is configured to assign the timestamp parameters for the generic bootstrapping architecture user security settings in a monotonically increasing sequence or a monotonically decreasing sequence.

7. The apparatus as recited in claim 4, wherein the home subscriber server is configured to assign the timestamp parameters for the generic bootstrapping architecture user security settings as a hash or part of the hash of a particular instance of the generic bootstrapping architecture user security settings of the bootstrapping server function and the home subscriber server.

8. The apparatus as recited in claim 1, wherein the bootstrapping server function is configured to store the timestamp parameter in a different numeric or alphanumeric form from the timestamp parameter stored in the home subscriber server.

9. The apparatus as recited in claim 1, wherein the bootstrapping server function is configured to transmit the timestamp parameter in different numeric or alphanumeric form from the timestamp parameter of the home subscriber server.

10. The apparatus as recited in claim 4, wherein when the generic bootstrapping architecture user security settings is first created, the timestamp is initialized to a numeric value or to a value indicative of time and/or date indicated by a clock in the home subscriber server.

11. The apparatus as recited in claim 4, wherein each time the generic bootstrapping architecture user security settings is modified, the generic bootstrapping architecture user security settings becomes a new version, and the timestamp is incremented or decremented by 1 or is changed to a current time and/or date indicated by a clock in the home subscriber server.

12. The apparatus as recited in claim 4, wherein the generic bootstrapping architecture user security settings is assigned a timestamp value that is a hash or part of that hash of a particular instance of the generic bootstrapping architecture user security settings.

13. A method, comprising:
transmitting a first message from a bootstrapping server function to a home subscriber server, wherein the first message includes a timestamp parameter corresponding to a generic bootstrapping architecture user security settings stored in the bootstrapping server function, and wherein the timestamp parameter corresponding to the generic bootstrapping architecture user security settings stored in the bootstrapping server function is compared with a timestamp parameter corresponding to a generic bootstrapping architecture user security settings stored in the home subscriber server;
receiving, from the home subscriber server, a second message at the bootstrapping server function excluding the generic bootstrapping architecture user security settings when the timestamp parameters of the generic bootstrapping architecture user security settings of the bootstrapping server function and the home subscriber server are equal, and receiving the second message at the bootstrapping server function including the generic bootstrapping architecture user security settings and the corresponding timestamp parameter from the home subscriber server and updating the bootstrapping server function using the generic bootstrapping architecture user security settings and the timestamp when the timestamp parameter of the generic bootstrapping architecture user security settings of the bootstrapping server function and the home subscriber server are not equal, wherein the bootstrapping server function and the home subscriber server provide authentication for a wireless mobile network.

14. The method as recited in claim 13, wherein sending of the first message comprises sending a request for an authentication vector.

15. The method as recited in claim 13, wherein the assigning of the timestamp parameters for the generic bootstrapping architecture user security settings is performed in a monotonically increasing sequence or a monotonically decreasing sequence.

16. The method as recited in claim 13, wherein the assigning of the timestamp parameters for the generic bootstrapping architecture user security settings is performed as a hash or part of the hash of a particular instance of the generic bootstrapping architecture user security settings of the bootstrapping server function and the home subscriber server.

17. The method as recited in claim 13, further comprising:
storing the timestamp parameter of the bootstrapping server function in a different numeric or alphanumeric form from the timestamp parameter stored in the home subscriber server.

18. The method as recited in claim 13, further comprising:
transmitting the timestamp parameter of the bootstrapping server function and timestamp parameter of the home subscriber server in different numeric or alphanumeric forms.

19. The method as recited in claim 13, further comprising:
changing the transmitted different numeric or alphanumeric form of the timestamp parameter back to its original form.

20. The method as recited in claim 13, further comprising:
assigning a value to the timestamp in a monotonically increasing sequence or a monotonically decreasing sequence.

21. The method as recited in claim 13, further comprising:
initializing the timestamp, when the generic bootstrapping architecture user security settings is first created, to a numeric value or to a time and/or date indicated by a clock in the home subscriber server.

22. The method as recited in claim 13, further comprising:
changing the timestamp to a current time and/or date of the timestamp each time the generic bootstrapping architecture user security settings is modified.

23. The method as recited in claim 13, further comprising:
assigning the generic bootstrapping architecture user security settings a timestamp value that is a hash or part of that hash of a particular instance of the generic bootstrapping architecture user security settings.

24. A computer readable storage medium including a computer program embodied within the computer readable storage medium, the computer program when executed controlling a processor to perform at least the following:
transmitting a first message from a bootstrapping server function to a home subscriber server, wherein the first message includes a timestamp parameter corresponding to a generic bootstrapping architecture user security settings stored in the bootstrapping server function, and wherein the timestamp parameter corresponding to the generic bootstrapping architecture user security settings stored in the bootstrapping server function is compared with a timestamp parameter corresponding to a generic bootstrapping architecture user security settings stored in the home subscriber server; and
receiving, from a home subscriber server, a second message at the bootstrapping server function excluding the generic bootstrapping architecture user security settings when the timestamp parameters of the generic bootstrapping architecture user security settings of the bootstrapping server function and the home subscriber server are equal; and receiving the second message at the bootstrapping server function including the generic bootstrapping architecture user security settings and the corresponding timestamp parameter from the home subscriber server and updating the bootstrapping server function using the generic bootstrapping architecture user security settings and the timestamp when the timestamp parameter of the generic bootstrapping architecture user security settings of the bootstrapping server function and the home subscriber server are not equal, wherein the bootstrapping server function and the home subscriber server provide authentication for a wireless mobile network.

25. The computer program as recited in claim 24, wherein sending of the first message comprises sending a request for an authentication vector.

26. The computer program as recited in claim 24, wherein the assigning of the timestamp parameters for the generic bootstrapping architecture user security settings is performed in a monotonically increasing sequence or a monotonically decreasing sequence.

27. The computer program as recited in claim 24, wherein the assigning of the timestamp parameters for the generic bootstrapping architecture user security settings is performed as a hash or part of the hash of a particular instance of the generic bootstrapping architecture user security settings of the bootstrapping server function and the home subscriber server.

28. The computer program as recited in claim 24, further comprising:
storing the timestamp parameter of the bootstrapping server function in a different numeric or alphanumeric form from the timestamp parameter stored in the home subscriber server.

29. The computer program as recited in claim 24, further comprising:
transmitting the timestamp parameter of the bootstrapping server function and timestamp parameter of the home subscriber server in different numeric or alphanumeric forms.

30. The computer program as recited in claim 24, further comprising:
assigning a value to the timestamp in a monotonically increasing sequence or a monotonically decreasing sequence.

31. The computer program as recited in claim 24, further comprising:
initializing the timestamp, when the generic bootstrapping architecture user security settings is first created, to a numeric value or to a time and/or date indicated by a clock in the home subscriber server.

32. The computer program as recited in claim 24, further comprising:
changing the timestamp to a current time and/or date each time the generic bootstrapping architecture user security settings is modified.

33. The computer program as recited in claim 24, further comprising:
assigning the generic bootstrapping architecture user security settings a timestamp value that is a hash or part of that hash of a particular instance of the generic bootstrapping architecture user security settings.

34. An apparatus, comprising:
transmitting means for transmitting a first message from a bootstrapping server function to a home subscriber server, wherein the first message includes a timestamp parameter corresponding to a generic bootstrapping architecture user security settings stored in the bootstrapping server function, and wherein the timestamp parameter corresponding to the generic bootstrapping architecture user security settings stored in the bootstrapping server function is compared with a timestamp parameter corresponding to a generic bootstrapping architecture user security settings stored in the home subscriber server;
receiving means for receiving from a home subscriber server a second message at the bootstrapping server function excluding the generic bootstrapping architecture user security settings when the timestamp parameters of the generic bootstrapping architecture user security settings of the bootstrapping server function and the home subscriber server are equal; and receiving means for receiving the second message at the bootstrapping server function including the generic bootstrapping architecture user security settings and the corresponding timestamp parameter from the home subscriber server and updating means for updating the bootstrapping server function using the generic bootstrapping architecture user security settings and the timestamp when the timestamp parameter of the generic bootstrapping architecture user security settings of the bootstrapping server function and the home subscriber server are not equal, wherein the bootstrapping server function and the home subscriber server provide authentication for a wireless mobile network.

35. An apparatus, comprising:

a home subscriber server configured to receive a first message from a bootstrapping server function, wherein the first message includes a timestamp parameter corresponding to a generic bootstrapping architecture user security settings stored in the bootstrapping server function, configured to compare the timestamp parameter corresponding to the generic bootstrapping architecture user security settings stored in the bootstrapping server function with a timestamp parameter corresponding to a generic bootstrapping architecture user security settings stored in the home subscriber server, configured to transmit a second message back to the bootstrapping server function excluding the generic bootstrapping architecture user security settings when the timestamp parameters of the generic bootstrapping architecture user security settings of the bootstrapping server function and the home subscriber server are equal and configured to transmit back to the bootstrapping server function including the generic bootstrapping architecture user security settings and the corresponding timestamp parameter when the timestamp parameter of the generic bootstrapping architecture user security settings of the bootstrapping server function and the home subscriber server are not equal, wherein the bootstrapping server function and the home subscriber server provide authentication for a wireless mobile network.

\* \* \* \* \*